UNITED STATES PATENT OFFICE.

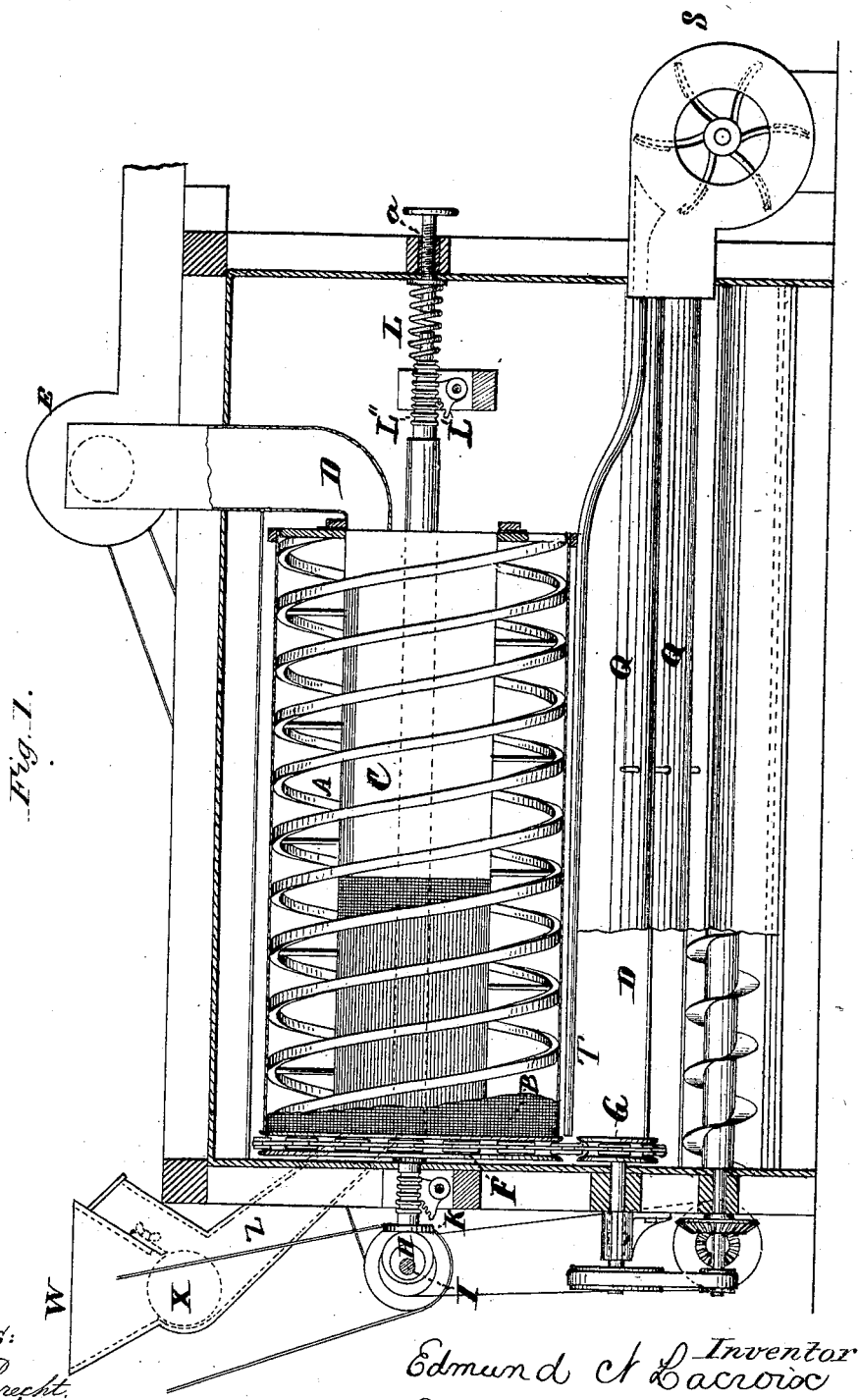

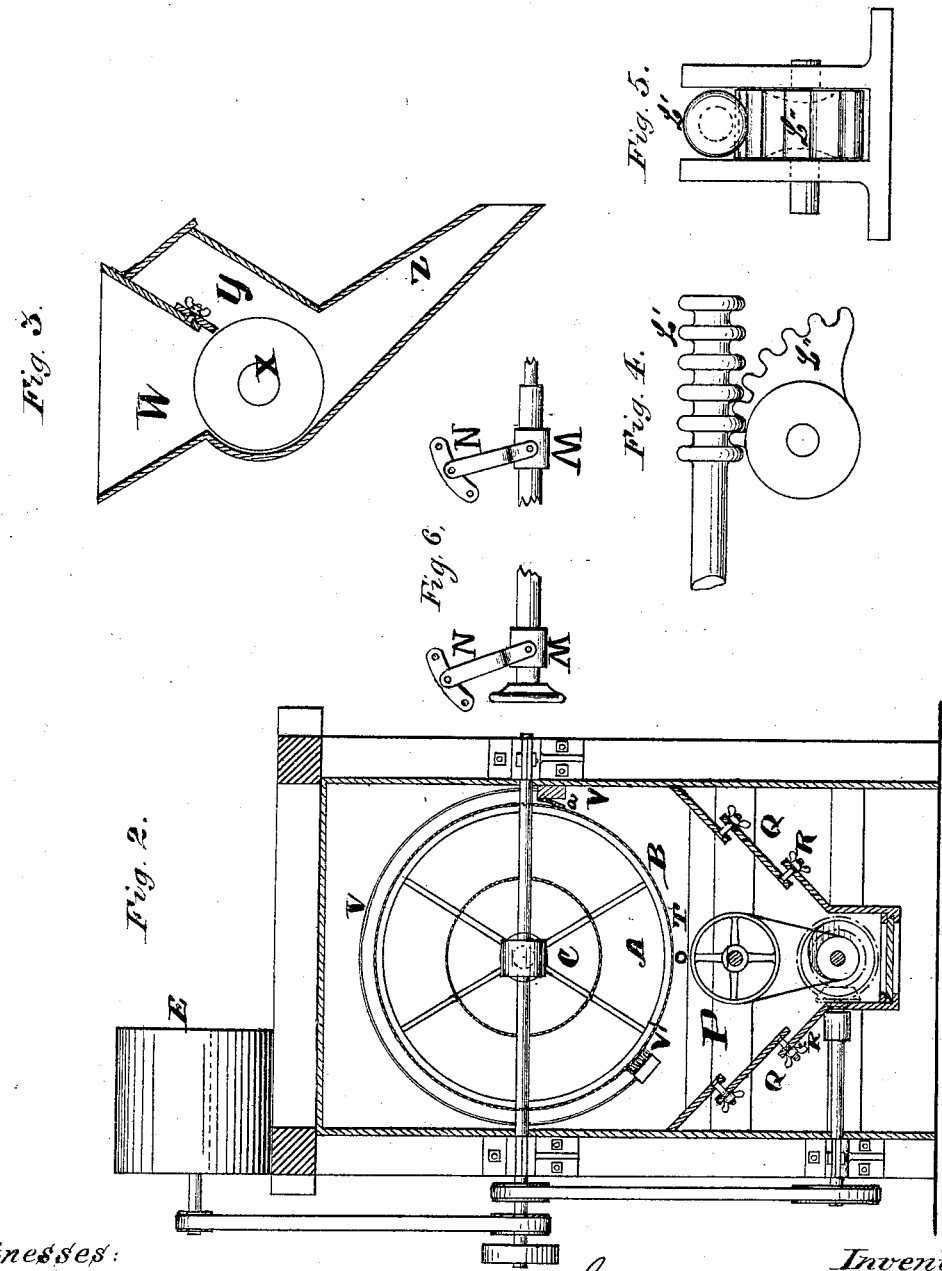

EDMUND N. LACROIX, OF MINNEAPOLIS, MINNESOTA.

IMPROVEMENT IN FLOUR AND MIDDLINGS PURIFIERS.

Specification forming part of Letters Patent No. 142,705, dated September 9, 1873; application filed June 23, 1873.

*To all whom it may concern:*

Be it known that I, EDMUND N. LACROIX, of Minneapolis, in the county of Hennepin and State of Minnesota, have invented certain new and useful Improvements in Flour and Middlings Purifier, of which the following is a specification:

This invention has for its object to improve the construction of bolting-reels employed for separating flour and middlings from bran and other matters, in order to render the same more effective in operation than others heretofore constructed. The invention consists essentially in the employment of a bolting-reel to which is imparted, in addition to the ordinary rotary movement, a horizontal reciprocating motion and a gradual rising and falling motion, whereby the flour or material to be separated is constantly partaking of a movement corresponding with the reel, which is conducive of bringing about a more perfect separation. The invention further consists in combining with a rotary and reciprocating bolting-reel a blower or fan which is designed for forcing a current of air against the bolting-reel, in order to prevent the adherence of particles of flour or bran, and to cause the latter and other light stuff to be continually blown to the surface of the meal, where it encounters a suction-blast which carries it off through a discharge-trunk. The invention further consists in combining with a series of gears or corrugations arranged upon the driving-shaft of the reel of segmental cams or eccentrics, for the purpose of imparting a rising-and-falling motion to the bolting-reel. The invention further consists in encircling the top portion of the bolting-reel with a covering upon which is arranged a brush or wiper, the brush serving to clean the meshes of the reel, while the covering causes the air from the blower to act directly upon the lower portion of the bolt.

In the accompanying drawings, Figure 1 is a vertical longitudinal section of my invention. Fig. 2 is a transverse section of the same. Fig. 3 is a detached view of the feeding device. Figs. 4 and 5 are detail views of the eccentric gearing for imparting a rising-and-falling movement to the reel.

In the present instance the bolting-reel is composed of a circular skeleton frame, A, of spirally-arranged ribs covered with the usual reel-cloth B; but I do not limit myself to this construction, as the form of the reel may be varied. Within the reel proper there is arranged a secondary reel cylinder or tube, C, of wire-gauze or coarse bolting-cloth, the object of which is to prevent the passage of bran, foreign matters, and vermin existing in the meal into the outer or separating reel. In proper respect to the rear end of the reel there is located a vertical trunk, D, communicating with the air-chest E of a suction-fan, so as to cause the suction-blast from said fan to enter the reel, for drawing out or removing from the meal all the bran and other light impurities tending to impair the quality of the flour and detrimental to the proper operation of the reel, by causing the clogging of the meshes of the same. A rotary movement is imparted to the reel by any suitable means, but in the present instance I resort to an endless chain or band, F, passing over a large pulley or hub on the reel-head and operated from a pulley-shaft, G, which has motion communicated to it from a suitable prime motor and intermediate shafting or gearing. In addition to the ordinary rotary movement, I impart to the bolting-reel a slight horizontal reciprocating motion, which is to be accomplished in various ways, as, for example, I may employ, as shown in Figs. 1 and 2, an eccentric or cam, H, arranged on the main or driving shaft I and acting against a plane or face disk, K, on the end of the reel-shaft. The cam or equivalent devices, arranged as shown, give to the bolting-reel a positive intermittent reciprocating movement, and, after the action of the cam has ceased, a return movement is imparted to the reel by a spring, L, which, in the present instance, is of a spiral form, so as to encircle the rear end of the reel-shaft and the forward end of a screw, $a$, which is employed for regulating or adjusting the tension of the spring, in order to vary the movement of the reel. An elliptic or other suitable spring may, with equal facility and effect, be, however, resorted to. The rising-and-falling motion of the reel is produced by two segmental toothed cams or eccentrics, L', working in a series of gears or corrugations, L'', upon the driving-shaft at the ends of the reel. Suitable bearings for the axes of the cams or eccentrics are arranged upon supports at each end of the reel. Motion is imparted to the cams or eccentrics L' by means of the gears or corrugations upon the shaft of the reel as it reciprocates. It will thus be apparent that during the reciprocating movement of the reel the segmental cams or eccentrics working in the gears or corrugations on the shaft will cause the reel to gradually rise and fall, which, in connection with the other movements of the reel, gives a thorough sifting motion to the same, which causes the fine bran and light fibrous matter to rise to the top, thereby rendering the separation of the same from the flour more certain and effective. Beneath the reel there is located a trough or chest, P, for receiving the sifted flour or middlings, the sides of which are formed of inclined boards Q, relatively arranged in respect of each other, so as to cause their edges to overlap, and connected by means of set or thumb-screws R, so as to enable the same to be brought close together or apart, for opening or closing the communication with the external air. In proper relation to the reel there is situated a fan-blower, S, operated in any suitable manner for forcing a blast or current of air through a tube, T, arranged immediately beneath the reel. Said tube is slitted longitudinally, or is otherwise perforated, so as to direct the air upon the periphery of the reel for cleaning the meshes of the same from accumulating flour, &c., and for blowing the lighter particles of offal fine bran above the heavier flour or middlings, where it encounters the suction-blast above referred to, which conveys it away.

When the tube is employed the adjustable inclined boards, serving the double purpose of gathering or deflecting the flour into the receiving-trough, may be open for permitting the entrance of the external air beneath the reel; but when the air-distributing tube is dispensed with and the blast is conducted directly into the reel-chest, then they are to be closed, as will be obvious.

In order to cause the air to act directly upon the lower portion of the reel, I cover the upper portion of the same with a curved or semicircular covering-board, V, to the inner surface of which I apply one or more wipers or brushes, V', which serve to assist in cleaning the bolting-cloth. A valve, $a$, is connected with the covering plate or bar, so as to prevent the blast of air entering the upper section of the bolt, by which means air is compelled to enter at the bottom of the said bolting-reel.

The material to be bolted is fed to the reel by a hopper, W, located at the front end of the reel and provided with a feed-roller, X, and adjustable plate Y, which serve to regulate the quantity of material passing through the spout Z into the reel.

I do not wish to confine myself to the cams or eccentrics and gears or corrugations upon the shaft for giving the rising or falling motion to the reel, as any of the well-known devices used in giving the same motion to the shoes of grain-separators may be used, such as inclined hangers, shown in Fig. 6, in which the reel-shaft passes loosely through collars or journal-boxes M, to which are pivoted the lower end of hangers N, having their opposite ends pivoted in plates attached to the frame of the machine, the rising-and-falling motion being produced by the motion of the inclined hangers as the reel reciprocates.

What I claim as my invention is—

1. The combination, with a reel, of rotating, reciprocating, and vertically-shaking mechanism, substantially as set forth.

2. In combination with a bolting-reel having a rotating and reciprocating movement, of a fan or blower for forcing a blast of air against and through the bottom of the reel and an exhaust-fan located above the reel, in direct communication with it, substantially as described, for the object specified.

3. In a middlings and flour purifier, the driving-gearing and reciprocating mechanism, as set forth, so combined with the reel as to impart a slow sifting motion to the reel, substantially as described.

4. The gears or corrugations L'' upon the shaft of the reel, in combination with the segmental cams or eccentrics L' for imparting a rising-and-falling motion to the reeel, substantially as and for the purpose specified.

5. The reel-covering plate V, having one or more brushes, V', combined, substantially as and for the purpose described.

In testimony that I claim the foregoing I have hereunto set my hand this 23d day of June, 1873.

EDMUND N. LACROIX.

Witnesses:
 WM. J. PEYTON,
 EDM. F. BROWN.